United States Patent
Toji

(10) Patent No.: US 7,645,080 B2
(45) Date of Patent: Jan. 12, 2010

(54) DIGITAL CAMERA, DIGITAL CAMERA SYSTEM, AND CONTROL PROGRAM FOR DIGITAL CAMERA SYSTEM

(75) Inventor: Shigeo Toji, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 299 days.

(21) Appl. No.: 11/785,487

(22) Filed: Apr. 18, 2007

(65) Prior Publication Data
US 2007/0248356 A1 Oct. 25, 2007

(30) Foreign Application Priority Data
Apr. 21, 2006 (JP) .............................. 2006-118063

(51) Int. Cl.
*G03B 17/00* (2006.01)
*G02B 7/14* (2006.01)
(52) U.S. Cl. ..................... 396/531; 348/360; 359/828
(58) Field of Classification Search ......... 396/529–531; 348/360; 359/826–828
See application file for complete search history.

(56) References Cited

U.S. PATENT DOCUMENTS 6,704,053 B1 * 3/2004 Niikawa et al. ............. 348/340

| | | | | |
|---|---|---|---|---|
| 2006/0067678 A1 * | 3/2006 | Senba et al. | ................ | 396/529 |
| 2006/0158750 A1 * | 7/2006 | Takahashi | ................... | 359/819 |
| 2006/0285226 A1 * | 12/2006 | Senba et al. | ................ | 359/694 |
| 2007/0147815 A1 * | 6/2007 | Tanaka | ........................ | 396/56 |

FOREIGN PATENT DOCUMENTS

JP 8-172561 A 7/1996

* cited by examiner

Primary Examiner—W. B. Perkey
Assistant Examiner—Dennis Hancock
(74) Attorney, Agent, or Firm—Sughrue Mion, PLLC

(57) ABSTRACT

A digital camera system is composed of a digital camera and a lens unit detachable to this digital camera. The digital camera includes a first taking lens and a first CCD image sensor to convert subject light into image data. The first taking lens is surrounded by a detachable decorative ring. When a hook release button is pressed to detach the decorative ring, a camera-side mount appears. The lens unit is attached to this camera-side mount, and photographing can be performed with a second taking lens and a second CCD image sensor in the lens unit.

2 Claims, 8 Drawing Sheets

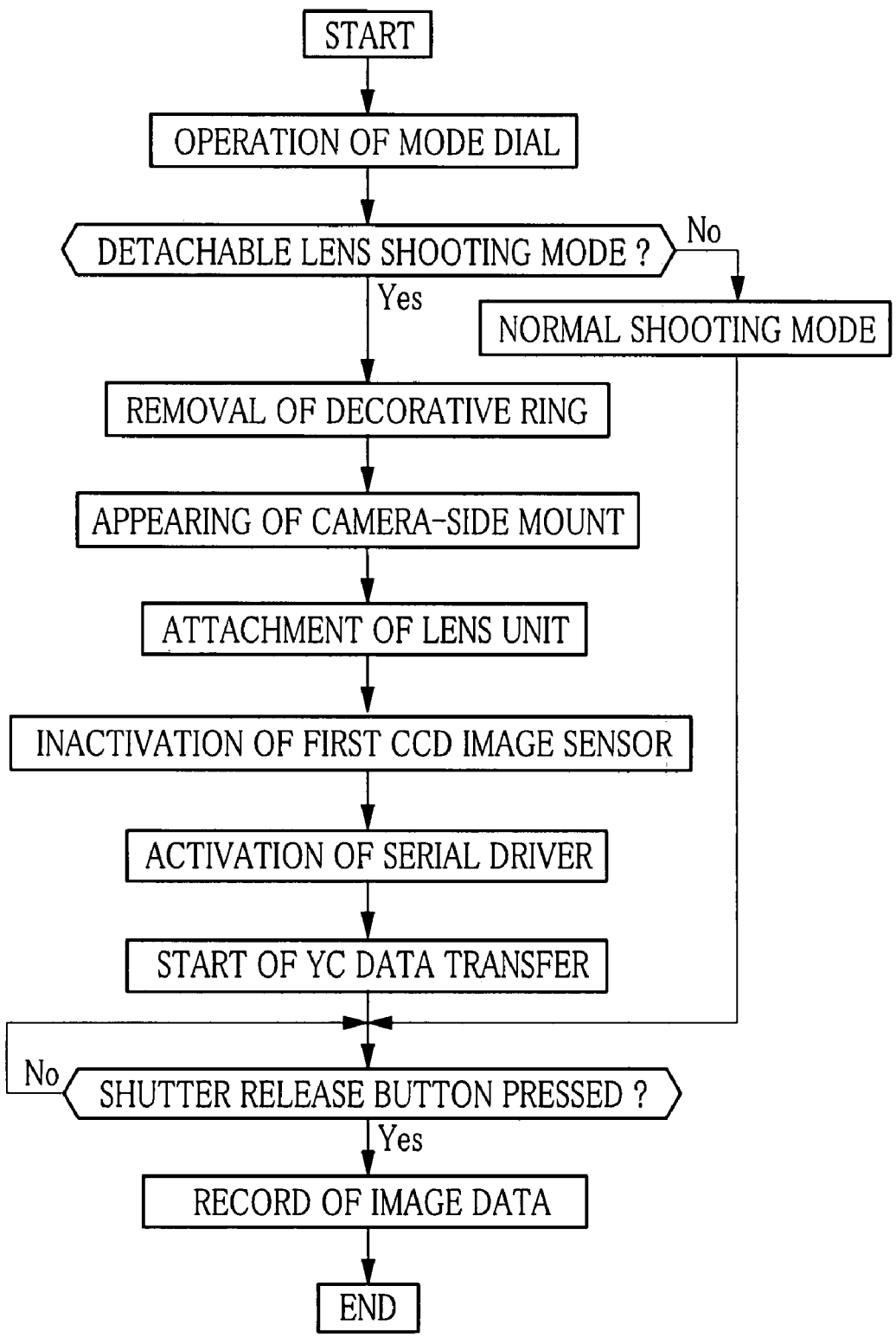

DIGITAL CAMERA, DIGITAL CAMERA SYSTEM, AND CONTROL PROGRAM FOR DIGITAL CAMERA SYSTEM

FIELD OF THE INVENTION

The present invention relates to a digital camera able to receive a detachable lens unit having a built-in image sensor, a digital camera system composed of this digital camera, and a control program for the digital camera system.

BACKGROUND OF THE INVENTION

Digital cameras have been popular for years, which convert subject light through a taking lens into an electrical signal using an image sensor, and produce image data from this electrical signal, and then store the image data in such a recording medium as a memory card.

Since the image sensors are getting smaller and less expensive these days, some of the digital cameras are composed of a lens unit having the image sensor in a lens barrel, and a camera body to which the lens unit is attached detachably (see, Japanese Patent Laid-open publication No. 08-172561). In this type of digital camera, the electrical signal from the lens unit is converted to the image data at the camera body, and stored in the recording medium. This configuration allows for selective use of various lens units in a single digital camera.

It is also planed, on the other front, to provide the camera body with another pair of the taking lens and the image sensor, so that photography can be carried out without the lens unit. However, with this configuration, a lens unit mount appears on the camera body when the taking lens of the camera body is used, and the overall appearance of the digital camera is therefore spoiled.

SUMMARY OF THE INVENTION

In view of the foregoing, a primary object of the present invention is to provide a digital camera and a digital camera system which allow for selective use of detachable lens units without spoiling the overall appearance thereof.

Another object of the present invention is to provide a control program for this digital camera system.

In order to achieve the above and other objects, the digital camera according to the present invention include a camera-side mount formed in the camera body so as to receive a detachable lens unit, and a ring-shaped cover detachably attached to the camera body to cover the camera-side mount. The camera body has a first taking lens and a first image sensor, and the lens unit has a second taking lens and a second image sensor. The camera-side mount surrounds the first taking lens. This camera-side mount may preferably be a plurality of bayonet slots. Additionally, it is possible to form a male screw on an outer circumference of the camera-side mount, and to form a female screw in the cover.

In another preferred embodiment of the present invention, the camera-side mount is formed on an inner peripheral surface of a fixed barrel provided in the camera body. This fixed barrel slidably supports a movable barrel that holds the first taking lens, and the movable lens is able to slide in an optical axis direction of the first taking lens. Specifically, the movable lens moves between a projecting position where said movable barrel projects from said camera body, and a retracted position where said movable barrel retracts inside said camera body. The camera-side mount may preferably be a plurality of engaging claws projecting toward a center of the fixed barrel. In this case, it is preferable to provide an outer peripheral surface of the movable barrel with grooves, extending in the optical axis direction, for the engaging claws to fit into.

The digital camera system according to the present invention is composed of one of these digital cameras and a lens unit detachably attached to the digital camera. This lens unit has a second taking lens, a second image sensor, and a unit-side mount to engage with the camera-side mount.

The camera-side mount and the unit-side mount are equipped with contact terminals, which contact each other to connect the lens unit and the digital camera electrically when the lens unit is attached to the digital camera.

The digital camera system according to another preferred embodiment of the present invention uses an adapter to connect the lens unit and the digital camera. One surface of this adapter has a camera body connecter to be detachably attached to the camera-side mount, and the other surface thereof has a lens unit connecter to be detachably attached to the unit-side mount. Additionally, the camera body connecter and the lens unit connecter are equipped with relay terminals. These relay terminals contact the contact terminals, and connect the lens unit and the digital camera electrically.

The control program for the digital camera system according to the present invention directs the digital camera to detect attachment of the lens unit to the camera body. Consequently, if the lens unit is attached, the digital camera is directed to inactive the first image sensor and then activate the second image sensor.

According to the present invention, the camera-side mount is concealed by the cover or the movable barrel. Accordingly, the overall appearance of the digital camera is not spoiled when the lens unit is detached. Additionally, the contact terminals on the camera-side mount and the unit-side mount establish an electrical communication between the digital camera and the lens unit when the lens unit is attached, and the digital camera system becomes more convenient.

Still additionally, the adopter allows for attachment of the lens unit and the digital camera having different types of mounts. The adopter is equipped with relay terminals to contact with the contact terminals of the camera-side mount and the unit-side mount. Accordingly, the convenience of the digital camera system is maintained even with the adopter.

According to another aspect of the present invention, the digital camera follows the control program, and inactivates the first image sensor and activates the second image sensor when the lens unit is attached thereto. The digital camera system is therefore operated efficiently, and power consumption of the system will be reduced.

BRIEF DESCRIPTION OF THE DRAWINGS

The above objects and advantages of the present invention will become more apparent from the following detailed description when read in connection with the accompanying drawings, in which:

FIG. 1A and FIG. 1B are perspective views of a digital camera according to a first embodiment of the present invention, wherein FIG. 1A shows the digital camera with a decorative ring attached thereto, and FIG. 1B shows the digital camera with the decorative ring detached;

FIG. 2A and FIG. 2B are perspective views of a digital camera system composed of the first embodiment digital camera and a lens unit, wherein FIG. 2A shows a state before attachment of the lens unit, and FIG. 2B shows the digital camera with the lens unit attached thereto;

FIG. 4 is a flow chart of operation of the digital camera system;

FIG. 5A to FIG. 5C are perspective views of the digital camera system in which the lens unit is attached to the camera body through an adopter, wherein FIG. 5A and FIG. 5B show a front side and a rear side of the adopter respectively, and FIG. 5C shows the adopter attached to the camera body;

FIG. 6A and FIG. 6B are perspective views of a digital camera according to a second embodiment of the present invention, wherein FIG. 6A shows a movable barrel at a projecting position and FIG. 6B shows the movable barrel at a retracted position.

DETAILED DESCRIPTION OF THE PREFERRED EMBODIMENTS

Figure 1A:
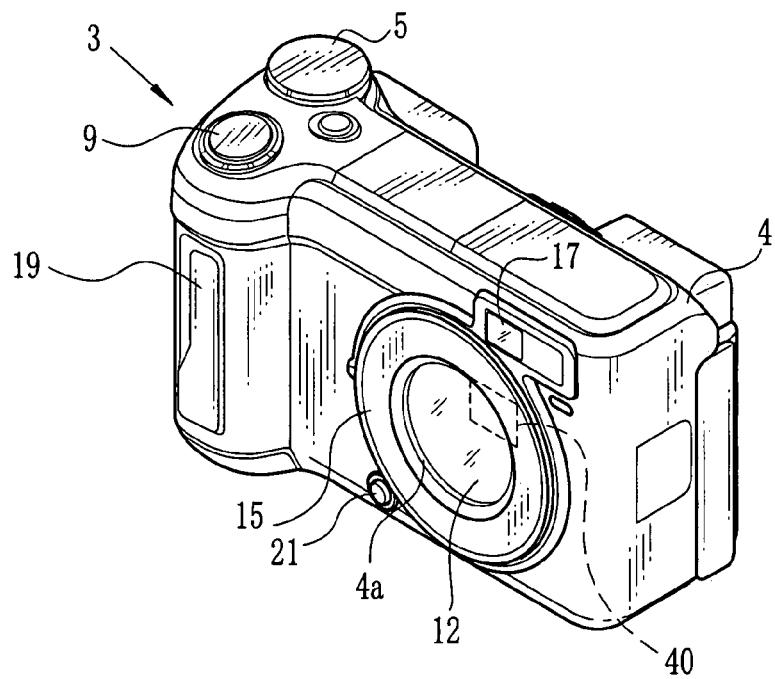

Referring to FIG. 1, a digital camera 3 has a camera body 4. Provided on a top face of the camera body 4 are a mode dial 5, a shutter release button 9, and some such. The mode dial 5 is rotated to select one of operation modes of, for example, a still image shooting mode using a built-in lens, a reproduction mode, and a detachable lens shooting mode (the still image shooting mode using a detachable lens unit).

On a front face of the camera body 4, a first taking lens 12, a decorative ring 15, a viewfinder window 17, and a grip 19 are provided. The first taking lens 12 appears in a lens opening 4a, above which the viewfinder window 17 resides. The decorative ring 15 is detachably attached to the camera body 4, and surrounds the lens opening 4a.

A rear face of the camera body 4 has an LCD panel 55 (see, FIG. 3) to display a through image or a menu screen, and a set of buttons (not shown) for operating the menu screen. When the still image shooting mode is selected with the operation dial 5, a through image of a subject is displayed on the LCD panel 55.

Figure 1B:
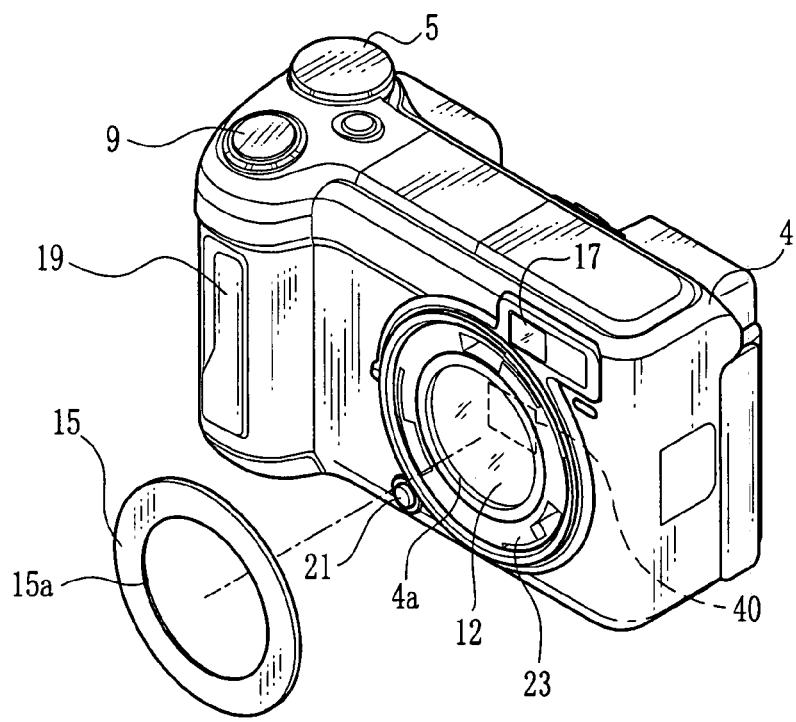

The decorative ring 15 is held by hooks (not shown) provided in the camera body 4. Next to the decorative ring 15, a hook release button 21 is provided. Pressing the hook release button 21 moves the hooks from a holding position to a retreat position, and the decorative ring 15 is separated from the camera body 4. Thereby, as shown in FIG. 1B, a camera-side mount 23 appears around the lens opening 4a. The camera-side mount 23 is configured to receive a lens unit 25 detachably attached thereto. Also, the camera body 4 has an USB port and a recording media slot (both not shown) on its side face.

Figure 2A:
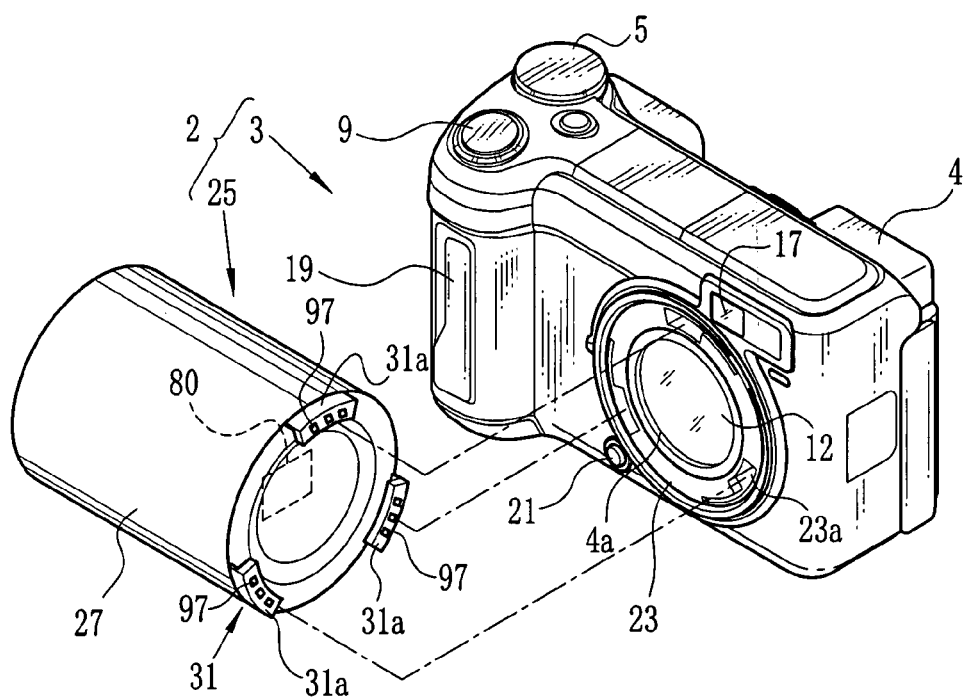

As shown in FIG. 2A, the digital camera 3 and the lens unit 25 compose a digital camera system 2. The lens unit 25 includes a lens barrel 27 and a second taking lens 29 (see, FIG. 2B). On an imaging surface side of the second taking lens 29, a second CCD image sensor 80 is provided. Additionally, the lens unit 25 has at one end a unit-side mount 31 to engage with the camera-side mount 23. The unit-side mount 31 includes equally spaced three bayonet lugs 31a, which have contact terminals 97 for signal transfer. It is to be understood that although the contact terminals 97 appear on an outer side of the bayonet lug 31a in the drawing, they can be placed on an inner side of the bayonet lug 31a.

Figure 2B:
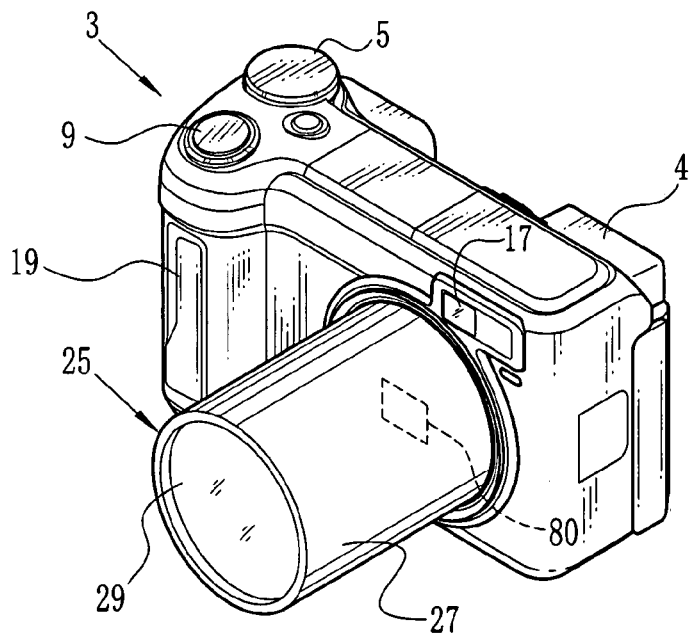

The camera-side mount 23 includes three bayonet slots 23a corresponding to each of the bayonet lugs 31a. In operation, the bayonet lugs 31a are pushed into the bayonet slots 23a, and the lens unit 25 is rotated clockwise. The bayonet lugs 31a and the bayonet slots 23a thereby engage with each other, and the lens unit 25 is attached to the digital camera 3, as shown in FIG. 2B. At this point, the contact terminals 97 of the lens unit 25 are connected electrically to contact terminals 75 (see, FIG. 3) of the digital camera 3. This electrical connection allows for data transfer between the lens unit 25 and the digital camera 3. It is to be understood that the lens unit 25 is rotated counter-clockwise and detached from the digital camera 3.

Figure 3:
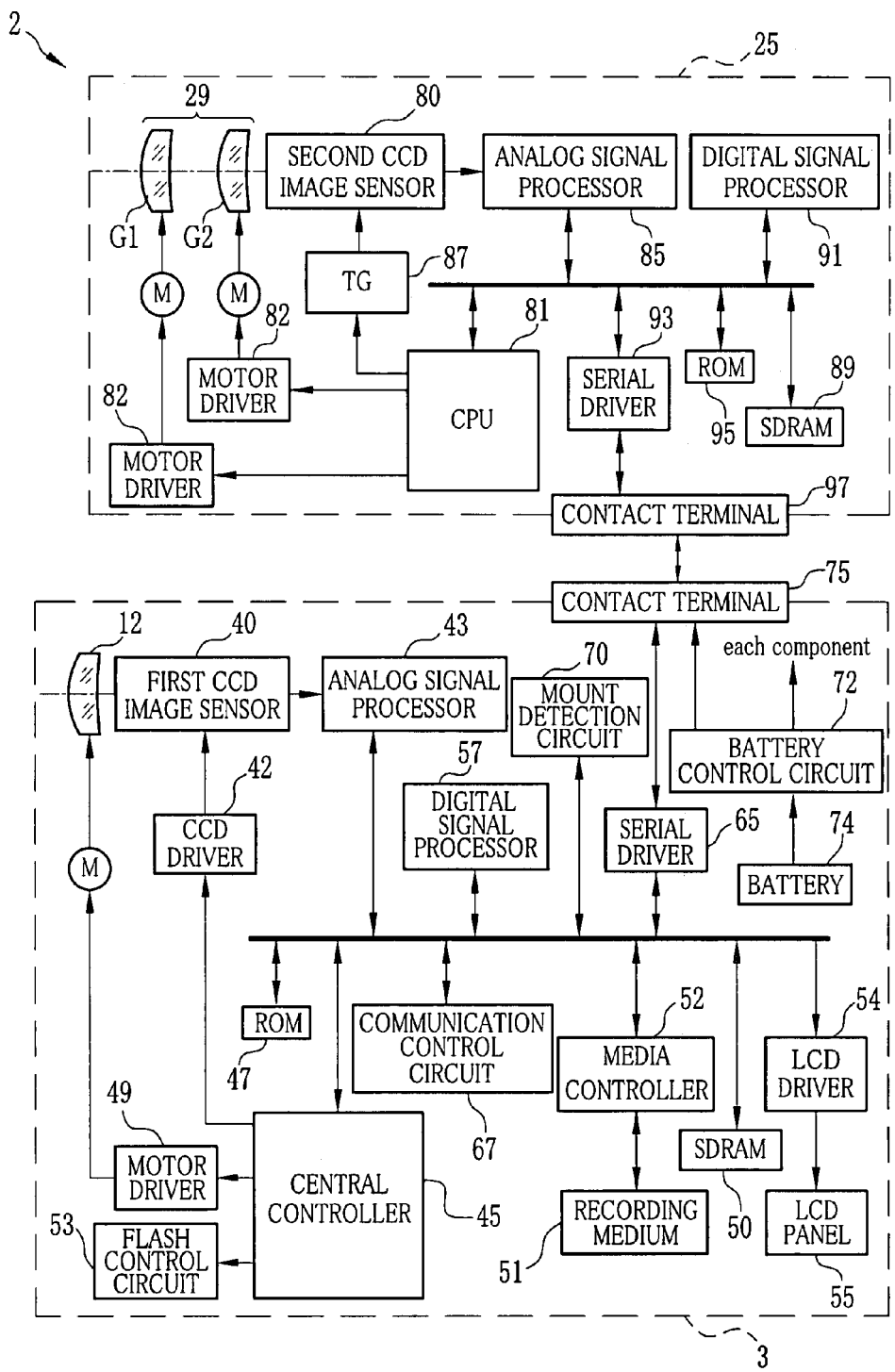
FIG. 3 is a block diagram illustrating an electrical configuration of the digital camera system of FIG. 2.

As shown in FIG. 3, the digital camera 3 has a first CCD image sensor 40, a CCD driver 42, an analog signal processor 43, a central controller 45, ROM 47, a motor driver 49, an SDRAM 50, a media controller 52, a flash control circuit 53, an LCD driver 54, a digital signal processor 57, a decompression circuit, a serial driver 65, a communication control circuit 67, a mount detection circuit 70, a battery control circuit 72 and others.

The first CCD image sensor 40 is controlled by drive pulses coming from the CCD driver 42, and converts subject light into an electrical image signal. The analog signal processor 43 includes a correlation double sampling (CDS) circuit, an amplifier circuit, and A/D converter circuit. The image signal, input to the analog signal processor 43, is converted by the CDS circuit into an RGB analog signal that represents each cell of the first CCD image sensor 40. The RGB analog signal is amplified by the amplifier circuit, and digitized by the A/D converter circuit into RAW data at 12 bits per pixel. The RAW data is temporarily written to the SDRAM 50.

The digital signal processor 57 retrieves one frame worth of the RAW data from the SDRAM 50, and compresses this RAW data to convert it into luminance and chrominance data (hereinafter, YC data) at 8 bits per pixel. The YC data is transferred to the SDRAM 50 and the LCD driver 54. When the shutter release button 9 is pressed, the digital signal processor 57 retrieves the YC data from the SDRAM 50, and converts it into image data in a predetermined compression format. The image data is then transferred to the media controller 52 and stored in a recording medium 51.

ROM 47 is composed of, for example, a non-volatile flash memory, and stores various programs for the digital camera 3. The central controller 45 retrieves an appropriate program from the ROM 47 when needed, and runs the program. The central controller 45 also controls each component of the digital camera 3.

The LCD driver 54 drives the LCD panel 55 to display an image. For example, when any shooting mode is selected with the mode dial 5, the LCD driver 54 directs the LCD panel 55 to display a through image of a subject which is renewed periodically.

The mount detection circuit 70 sends a detection signal to a CPU 81 of the lens unit 25 through the contact terminals 75, 97 of the camera-side mount 23 and the unit-side mount 31 when the lens unit 25 is attached to the camera body 4. Receiving the detection signal, the CPU 81 sends back a reply signal to the mount detection circuit 70. Accordingly, the attachment of the lens unit 25 is confirmed.

The communication control circuit 67 turns on the serial driver 65 when receiving the detection signal from the mount detection circuit 70, and turns off the serial driver 65 when the detection signal is not input.

When the lens unit 25 is attached to the camera body 4, the central controller 45 reads out a type and a serial number of the lens unit 25 from ROM 95, and writes this information to the SDRAM 50. Storing the information of the lens unit 25 in the digital camera 3 in this manner enables to use different lens units 25.

The central controller 45 also retrieves a control program from the ROM 47. Following this control program, the central controller 45 inactivates the first CCD image sensor 40, the CCD driver 42, the analog signal processor 43, and the digital signal processor 57 when receiving the detection signal from the mount detection circuit 70, and then activates the second CCD image sensor 80 in the lens unit 25.

When the central controller 45 starts controlling the lens unit 25, the YC data is transferred from the lens unit 25 and temporarily stored in the SDRAM 50. This YC data is converted into the image data in a desired file format, such as a JPEG format, and stored in the recording medium 51 when the shutter release button 9 is pressed. If the shutter release button 9 is not pressed, on the other hand, this YC data is transferred from the SDRAM 50 to the LCD driver 54, and a through image of a subject is displayed on the LCD panel 55.

The media controller 52 gains access to the recording medium 51, such as a memory card, for read/write of the image data. Receiving a write command from the central controller 45, the media controller 52 writes the image data to the recording medium 51. Also, the media controller 52 retrieves the image data from the recording medium 51 when receiving a read command from the central controller 45 during the reproduction mode.

The lens unit 25 has the second taking lens 29, the second CCD image sensor 80, the CPU 81, two motor drivers 82, an analog signal processor 85, a timing generator (hereinafter, TG) 87, an SDRAM 89, a digital signal processor 91, a serial driver 93, a ROM 95, and the contact terminals 97.

The second taking lens 29 is composed of several lens groups including a zoom lens G1 and a focus lens G2.

The second CCD image sensor 80 is controlled by drive pulses coming from the TG 87, and converts subject light into an electrical image signal. The analog signal processor 85 includes a correlation double sampling (CDS) circuit, an amplifier circuit, and A/D converter circuit. The image signal, input to the analog signal processor 85, is converted by the CDS circuit into an RGB analog signal that represents each cell of the second CCD image sensor 80. The RGB analog signal is amplified by the amplifier circuit, and digitized by the A/D converter circuit into RAW data at 12 bits per pixel. The RAW data is stored temporarily in the SDRAM 89.

The digital signal processor 91 retrieves one frame worth of the RAW data from SDRAM 89, and compresses this RAW data to convert it into YC data at 8 bits per pixel. The YC data is stored temporarily in the SDRAM 89.

The serial driver 93 controls data communication performed through the contact terminals 97, and transfers the YC data from the SDRAM 89 to the digital camera 3.

The ROM 95 is composed of, for example, an EEPROM (Electrically Erasable Programmable ROM), and stores various information about the lens unit 25 such as type data, serial number data of an unique serial number and spec data, along with various programs for the lens unit 25. This information is read out to the digital camera 3 when the lens unit 25 is attached to the digital camera 3.

The CPU 81 controls each component in the lens unit 25. For example, the CPU 81 sends a wide angle signal or a telephoto signal to the motor drivers 82. Following this signal, the motor drivers 82 move the zoom lens G1 and the focus lens G2 along the optical axis. It is to be noted that a numeral M in the drawing represents a motor.

Now, the operation of the present invention is explained with reference to FIG. 4. Firstly, the mode dial 5 is operated to select a detachable lens shooting mode. Then, the decorative lens 15 is removed from the digital camera 3 to uncover the camera-side mount 23, to which the high-performance lens unit 25 is to be attached. When the lens unit 25 is attached, the first CCD image sensor 40 is inactivated. Consequently, the serial drivers 65, 93 are activated to establish a communication line between the digital camera 3 and the lens unit 25. The digital camera 3 processes the YC data sent from the lens unit 25 through this communication line and, when the shutter release button 9 is pressed, stores the image data in a predetermined format to the recording medium 51.

Figure 5A:
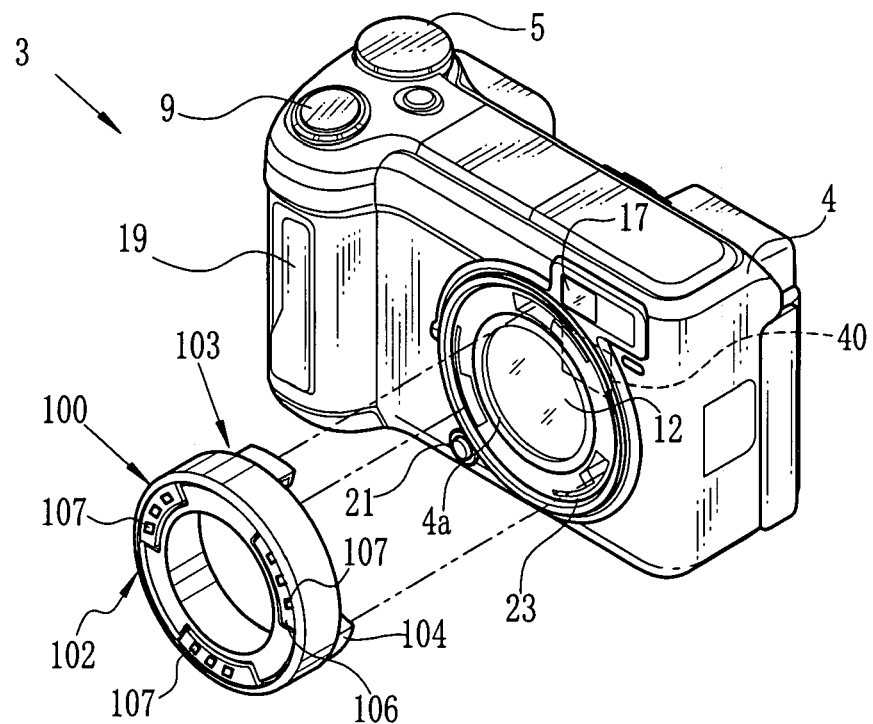
Figure 5B:
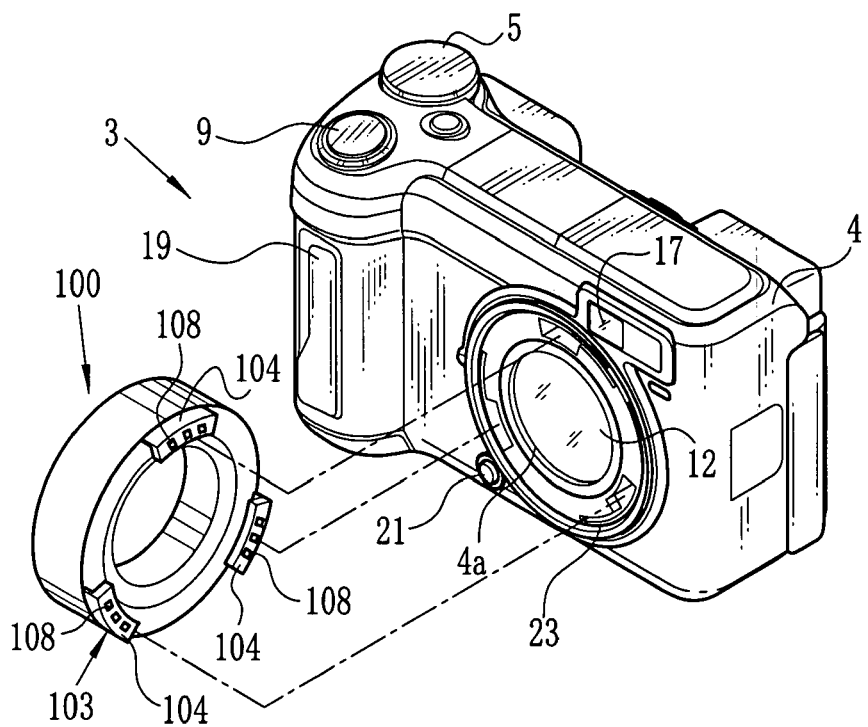
Figure 5C:
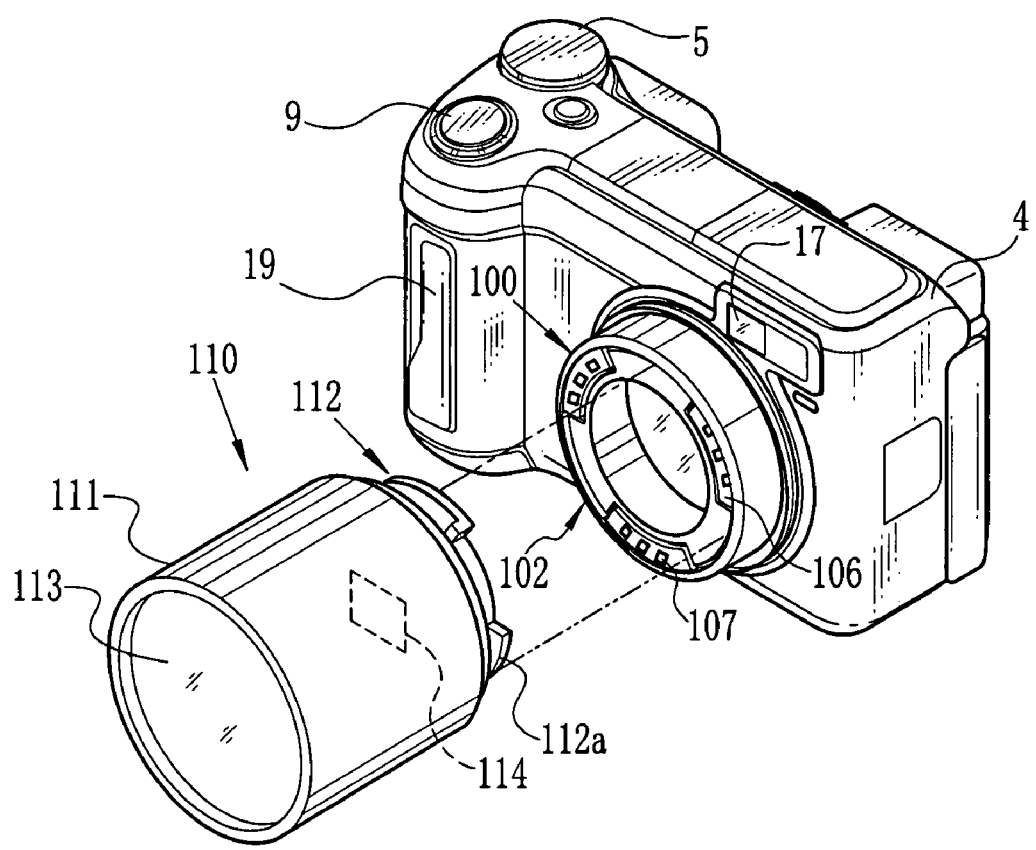

Although the lens unit 25 is attached directly to the camera-side mount 23 in the above embodiment, the lens unit may also be attached through a detachable adapter 100, as shown in FIG. 5A to FIG. 5C. The adapter 100 has two different types of connectors, a lens unit connector 102 on the front face and a camera body connector 103 on the rear face. The camera body connector 103 is equipped with, for example, three bayonet lugs 104, and the lens unit connector 102 is equipped with bayonet slots 106 that engage with bayonet lugs 112*a* of a later described lens unit 110. The bayonet slots 106 and the bayonet lugs 104 of the adapter 100 have First and second relay terminals 107, 108 respectively, and these relay terminals 107, 108 are connected together through a circuit board or the like.

As shown in FIG. 5C, the lens unit 110 includes a lens barrel 111, a taking lens 113, a CCD image sensor 114. Also, provided at a rear end of the lens unit 110 is a unit-side mount 112 which differs in type from the camera-side mount 23. The bayonet lugs 112*a* of the unit-side mount 112 are made engaged with the bayonet slots 106 of the adapter 100, and the bayonet lugs 104 of the adapter 100 are made engaged with the bayonet slots 23*a* of the camera-side mount 23. Accordingly, the lens unit 110 is attached to the digital camera 3. At this point, the lens unit 110 and the digital camera 3 are connected electrically by the first and the second relay terminals 107, 108. In this manner, the adapter 100 connects the digital camera and the lens unit having different types of connecters, and allows for using more kinds of lens units.

Figure 6A:
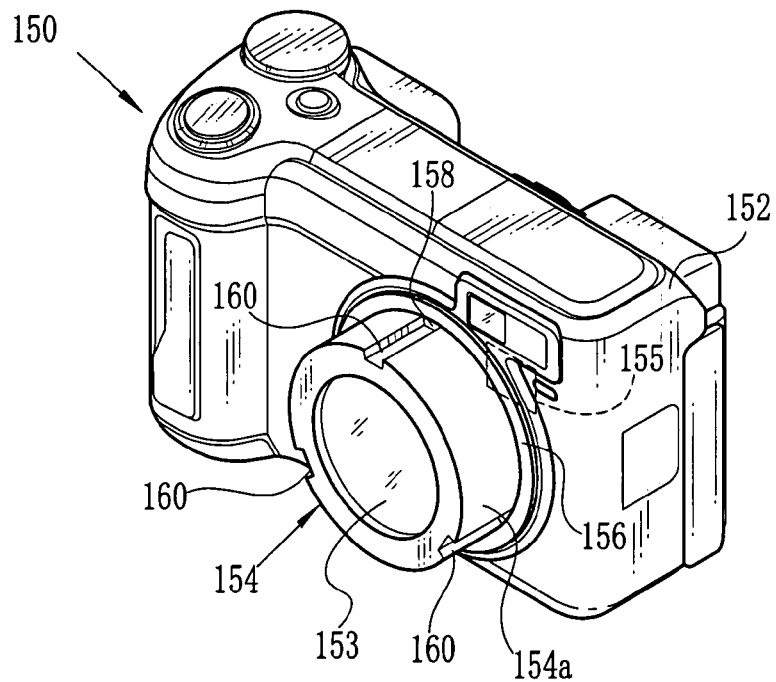

In the above embodiments, the lens units 25, 110 are attached to the digital camera 3 through the camera-side mount 23 on the front face of the camera body 4. However, it is also possible to equip the camera body with a fixed barrel, as shown in FIG. 6A, for the attachment of the lens unit. A digital camera 150 has a camera body 152 equipped with a movable barrel 154 holding a first taking lens 153, and a fixed barrel 156 supporting the movable barrel 154 slidably. The movable barrel 154 is able to slide between a projecting position where the movable barrel 154 projects from the camera body 152, and a retracted position where the movable barrel 154 retracts inside the camera body 152.

Figure 6B:
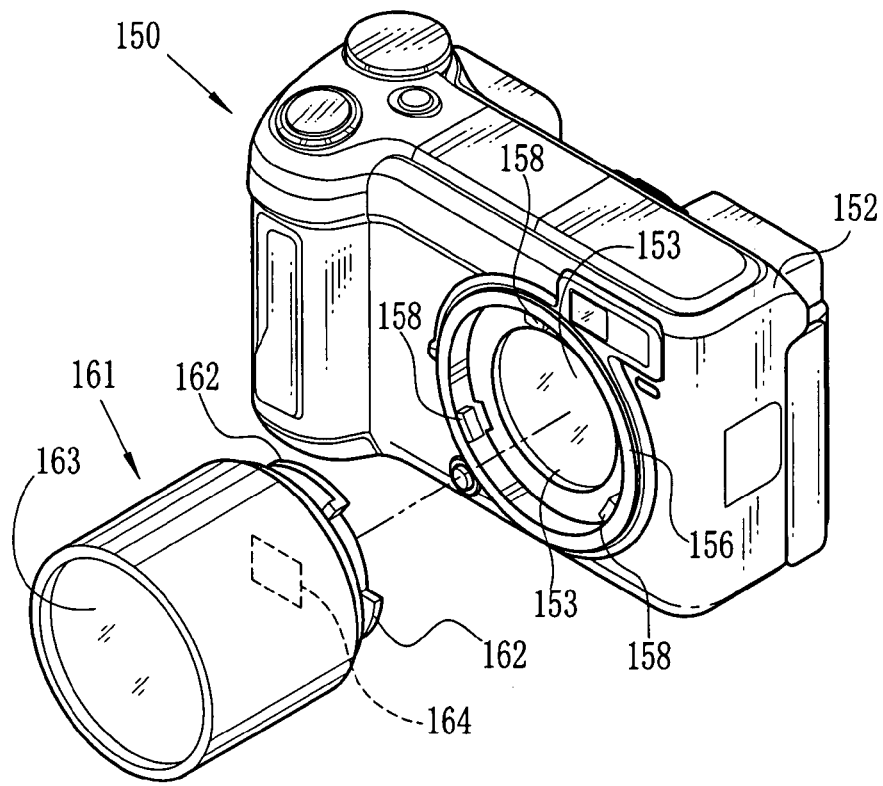

As shown in FIG. 6B, a camera-side mount with three of second engaging claws 158 is formed on an inner peripheral surface of the fixed barrel 156. These second engaging claws 158 engage with first engaging claws 162 of a later described lens unit 161. An outer peripheral surface of the movable barrel 154 has three grooves 160 (see, FIG. 6A) at the positions corresponding to the second engaging claws 158, and thus the slide of the movable barrel 154 is not obstructed.

The lens unit 161 includes a second taking lens 163, and a second CCD image sensor 164 to convert subject light coming through this second taking lens 163 into an electrical image signal. Also, provided at a rear end of the lens unit 161 are the first engaging claws 162 of bayonet type. For attachment of the lens unit 161 to the digital camera 150, the movable barrel 154 is firstly moved to the retracted position to reveal the second engaging claws 158 on the camera body 152. Then, the first engaging claws 162 of the lens unit 161 are engaged with the second engaging claws 158. When the lens unit 161 is detached from the digital camera 150, the movable barrel 154 is moved to the projecting position to conceal the inner peripheral surface of the fixed barrel 156. Accordingly, the overall appearance of the digital camera is not spoiled by the absence of the lens unit 161.

Although the bayonet-type mounts are used in the above embodiments, other types of mounts such as screw type mounts or spigot type mounts may be used instead. Alternatively, the camera-side mount and the unit-side mount can be a female connector and a male connecter, which are connected to each other for the attachment of the lens unit to the digital camera.

Figure 7A:
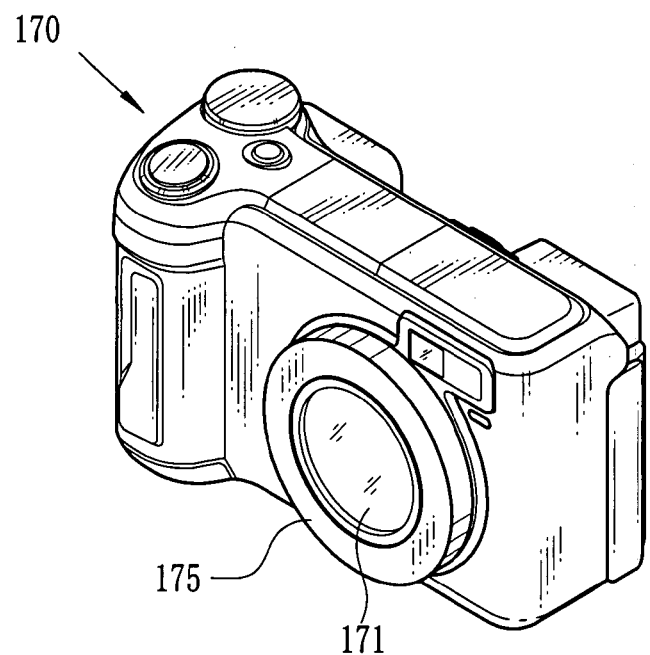
FIG. 7A and FIG. 7B are perspective views of a variation of the first embodiment digital camera, in which a male screw is formed on an outer peripheral face of a camera-side mount.
Figure 7B:
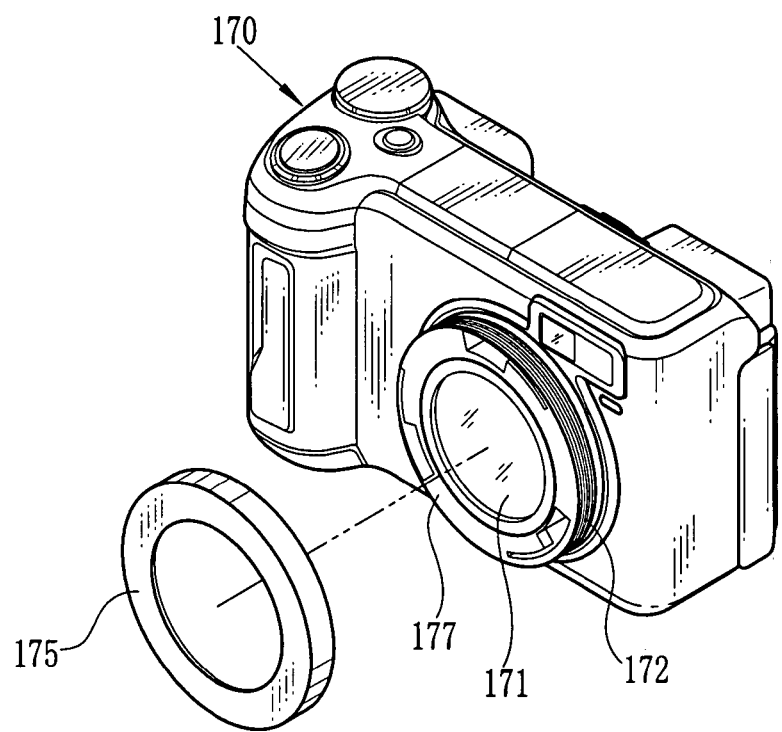

Additionally, the decorative ring 15 is held and released by the hooks and the hook release button 21, the present invention is not limited to these. For example, as shown in FIG. 7A and FIG. 7B, a male screw 172 may be formed around a taking lens 171, and a female screw to engage with the male screw 172 may be formed in a decorative ring 175. This configuration does not require a connection mechanism for the decorative ring, and therefore serves to reduce the size and the cost of the digital camera.

The above embodiments are all explained with the digital camera which mainly captures still images. However, the present invention is also applicable to video cameras which mainly capture movies.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera having a camera body with a first taking lens and a first image sensor to generate image data from subject light, comprising:
    a movable barrel for holding said first taking lens and slidable in an optical axis direction of said first taking lens, said movable barrel sliding between a projecting position where said movable barrel projects from said camera body and a retracted position where said movable barrel retracts inside said camera body;
    a fixed barrel formed in said camera body and supporting said movable barrel slidably; and
    a camera-side mount formed on an inner peripheral surface of said fixed barrel, said camera-side mount receiving a detachable lens unit having a second taking lens and a second image sensor,
    wherein said camera-side mount is a plurality of engaging claws projecting toward a center of said fixed barrel, and wherein an outer peripheral surface of said movable barrel has grooves along said optical axis direction for said engaging claws to fit into.

2. A digital camera system composed of a digital camera having a camera body with a first taking lens and a first image sensor to generate image data from subject light, and a lens unit having a second taking lens and a second image sensor and detachably attached to said digital camera, comprising:
    (A) said digital camera comprising:
    a movable barrel for holding said first taking lens and slidable in an optical axis direction of said first taking lens, said movable barrel sliding between a projecting position where said movable barrel projects from said camera body and a retracted position where said movable barrel retracts inside said camera body;
    a fixed barrel formed in said camera body and holding said movable barrel slidably;
    a camera-side mount formed on an inner peripheral surface of said fixed barrel, said camera-side mount receiving said lens unit; and
    (B) said lens unit comprising:
    a unit-side mount to engage with said camera-side mount,
    wherein said camera-side mount is a plurality of engaging claws projecting toward a center of said fixed barrel, and wherein an outer peripheral surface of said movable barrel has grooves along said optical axis direction for said engaging claws to fit into.

\* \* \* \* \*